US 12,255,866 B2

(12) United States Patent
Huang et al.

(10) Patent No.: US 12,255,866 B2
(45) Date of Patent: Mar. 18, 2025

(54) METHOD AND APPARATUS FOR PROVIDING INFORMATION

(71) Applicant: Alibaba Singapore Holding Private Limited, Singapore (SG)

(72) Inventors: Xu Huang, Hangzhou (CN); Jie Xu, Hangzhou (CN); Liang Shi, Hangzhou (CN); Danqiong Chen, Hangzhou (CN); Jie Gao, Hangzhou (CN); Yuping Zhang, Hangzhou (CN)

(73) Assignee: Alibaba Singapore Holding Private Limited, Singapore (SG)

( * ) Notice: Subject to any disclaimer, the term of this patent is extended or adjusted under 35 U.S.C. 154(b) by 0 days.

(21) Appl. No.: 18/328,448

(22) Filed: Jun. 2, 2023

(65) Prior Publication Data
US 2023/0328028 A1    Oct. 12, 2023

Related U.S. Application Data

(63) Continuation of application No. PCT/CN2021/135637, filed on Dec. 6, 2021.

(30) Foreign Application Priority Data

Dec. 10, 2020  (CN) .......................... 202011454436.X

(51) Int. Cl.
*H04L 51/52* (2022.01)
*H04L 51/04* (2022.01)

(52) U.S. Cl.
CPC .............. *H04L 51/52* (2022.05); *H04L 51/04* (2013.01)

(58) Field of Classification Search
CPC ..... H04L 51/52; H04L 51/04; G06F 16/9535; G06F 16/9536; G06Q 30/0631; G06Q 50/01
See application file for complete search history.

(56) References Cited

U.S. PATENT DOCUMENTS

2013/0212028 A1    8/2013   Delhaes
2013/0311329 A1   11/2013   Knudson et al.
(Continued)

FOREIGN PATENT DOCUMENTS

CN     102812432 A    12/2012
CN     103365893 A    10/2013
(Continued)

OTHER PUBLICATIONS

Chinese Search Report issued in corresponding Chinese Application No. 202011454436.X (1 page), Jul. 29, 2023.
(Continued)

*Primary Examiner* — El Hadji M Sall
(74) *Attorney, Agent, or Firm* — Finnegan, Henderson, Farabow, Garrett & Dunner, LLP

(57) ABSTRACT

A method for providing information includes receiving a reference notification message that a target account number is referenced, the reference notification message being sent by a first information system after receiving a request initiated by a first user for first information content by way of referencing the target account number, wherein first information content includes information content generated in the first information system, and the target account number is associated with a second information system; acquiring the first information content; acquiring, from an information library associated with the second information system, second information content related to the first information content; and providing the second information content to the first user.

16 Claims, 7 Drawing Sheets

(56) References Cited

U.S. PATENT DOCUMENTS

| | | |
|---|---|---|
| 2015/0100458 A1 | 4/2015 | Linden et al. |
| 2015/0135292 A1* | 5/2015 | Lee .................. H04L 51/52 |
| | | 726/7 |
| 2017/0004588 A1 | 1/2017 | Isaacson et al. |

FOREIGN PATENT DOCUMENTS

| | | |
|---|---|---|
| CN | 105391796 A | 3/2016 |
| CN | 110362714 A | 10/2019 |
| CN | 113297474 A | 8/2021 |
| WO | WO2022121827 A1 | 6/2022 |

OTHER PUBLICATIONS

European Patent Office Communication issued for Application No. 21902533.5 the Supplementary European Search Report (Art. 153(7) EPC) and the European search opinion dated May 6, 2024, 8 pages.
PCT International Search Report and Written Opinion mailed Mar. 2, 2022, issued in corresponding International Application No. PCT/CN2021/135637 (11 pgs.).

\* cited by examiner

METHOD AND APPARATUS FOR PROVIDING INFORMATION

CROSS-REFERENCE TO RELATED APPLICATIONS

The disclosure claims the benefits of priority to PCT Application No. PCT/CN2021/135637, filed on Dec. 6, 2021, which claims the benefits of priority to Chinese Application 202011454436.X, filed on Dec. 10, 2020, both of which are incorporated herein by reference in their entireties.

TECHNICAL FIELD

The present disclosure relates to information processing, and in particular, to a method, an apparatus, and an electronic device for providing information.

BACKGROUND

In the information age, people can acquire various kinds of information through various approaches, and meanwhile can share information with other users, and so on. For example, in some social networking websites or client-side devices, users can post what they see, hear, and feel in their daily life in the form of text, pictures, videos, etc., so as to realize instant sharing of information, communication and interaction. In addition, a user can also browse and comment on the content posted by another user.

For content posted by one user, a browsing user may also have other requirements during the browsing process. For example, a user posts pictures and videos about "street photography", and the image content includes people wearing certain clothes. When browsing the images, the browsing user may be interested in the clothes, and may even want to buy the clothes of the same style, etc. At this time, generally, the browsing user can achieve the above purpose in different ways. In a first way, he can leave a message to the author (content posting user) in the comment area or message area of the content, and inquire about information of the clothes such as the brand and purchase channel. However, in the case of a large number of user comments, the author may not be able to see the message. Even if he can see it and reply, it may be difficult for the browsing user to acquire the desired commodity according to the channel given by the author. This is because, if the author purchases through an offline channel, there may not be a corresponding store near the browsing user. However, if the purchase is made through an online channel, it is often not allowed to reply with information about an external link in the content comment area (because the link related to a commodity object is usually in a commodity object information service system, which may belong to an external website for the current social networking system). Even if the link is provided, it is usually impossible to perform redirecting or copy operations, and the number of characters included in the link is often very large, so that it is usually unrealistic for the browsing user to input characters one by one.

In a second way, the browsing user can copy or download the browsed image content locally, and then reach a client-side device of the relevant commodity object information service system, and initiate a search for the commodity objects of the similar styles or the same style by way of image search. This way can help the user quickly acquire clothes of the similar styles or the same style. However, since many users are not familiar with or not used to image search or even do not know about image search, these users are difficult to acquire corresponding information by way of image search.

Therefore, how to provide more associated information content for the content that a user of an information system is interested in has become a technical problem that needs to be solved by those skilled in the art.

SUMMARY OF THE DISCLOSURE

Embodiments of the present disclosure provide a method for providing information. The method includes receiving a reference notification message that a target account number is referenced, the reference notification message being sent by a first information system after receiving a request initiated by a first user for first information content by way of referencing the target account number, and the first information content includes information content generated in the first information system, wherein the target account number is associated with a second information system; acquiring the first information content; acquiring, from an information library associated with the second information system, second information content related to the first information content; and providing the second information content to the first user.

Embodiments of the present disclosure provide an apparatus for providing information. The apparatus includes a memory configured to store instructions; and one or more processors configured to execute the instructions to cause the apparatus to perform operations including: receiving a reference notification message that a target account number is referenced, the reference notification message being sent by a first information system after receiving a request initiated by a first user for first information content by way of referencing the target account number, and the first information content includes information content generated in the first information system, wherein the target account number is associated with a second information system; acquiring the first information content; acquiring, from an information library associated with the second information system, second information content related to the first information content; and providing the second information content to the first user.

Embodiments of the present disclosure provide a non-transitory computer readable medium that stores a set of instructions that is executable by one or more processors of an apparatus to cause the apparatus to perform operations including: receiving a reference notification message that a target account number is referenced, the reference notification message being sent by a first information system after receiving a request initiated, wherein the request is initiated by a first user for first information content by way of referencing the target account number, and the first information content includes information content generated in the first information system, and the target account number is associated with a second information system; acquiring the first information content; acquiring, from an information library associated with the second information system, second information content related to the first information content; and providing the second information content to the first user.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
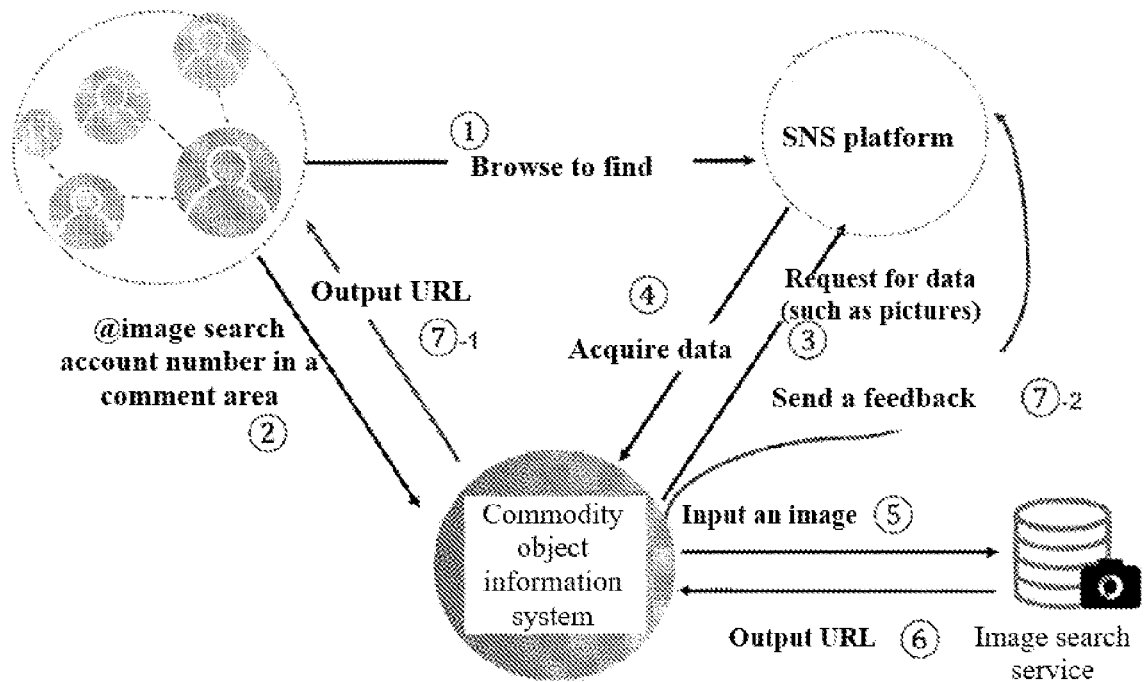
FIG. 1 is a schematic diagram of a system architecture, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In some embodiments of the present disclosure, to better provide more associated information content for the content that a user of a first information system (including a social networking system, an instant messaging system, etc.) is interested in, firstly, a target account number may be registered in the first information system with the identity of a second information system (for example, a commodity object information system, a knowledge information system, a news information system, etc.), and messages referencing the target account number in the first information system can be subscribed by implementing relevant interfaces in the first information system. In this way, when the user browses the interested first information content in the first information system and wants to acquire more relevant information, the user can initiate a search request for the first information content by way of referencing the target account number. For example, when a first user browses a picture posted by a second user in a social networking system and wants to acquire information about a commodity object related to the picture, the first user can initiate a search request by way of referencing a target account number associated with a commodity object information system (for example, @the account name of the target account number) in a comment area of the picture. Or, when a first user participates in a group conversation in an instant messaging system, and a second user sends a picture in the group. The first user wants to acquire news information related to the picture. Then the first user can send new instant messaging message content in the group conversation, and reference a target account number associated with a news information system in the message content (can also reference the picture, etc.). Thereafter, the first information system can notify the second information system of the message that the target account number is referenced, and then the second information system can acquire the corresponding first information content (for example, the pictures, videos, etc.) from the first information system, and search for the second information content associated with the first information content from an information library associated with the second information system. Thereafter, the second information content may be provided for the first user by way of sending a message to the first account number associated with the first user in the first information system. In this way, when the user in the first information system browses the interested first information content, the user can acquire the second information content related to the first information content provided by the second information system only by initiating the search request for the first information content by way of referencing the target account number, without switching to the second information system and manually initiating operations such as image search.

FIG. 1 is a schematic diagram of a system architecture, according to some embodiments of the present disclosure. As shown in FIG. 1, some embodiments of the present disclosure mainly provide a search service to the first user in the first information system by means of the second information system. The processing flow may be as follows: firstly, the first user finds interested first information content in the process of browsing the first information system (for example, an SNS (social networking service) platform), and reference a target account number related to the second information system in a comment content or a new instant messaging content when making the comment in a comment area of the first information content or sending the new instant messaging content by referencing the first information content etc. Thereafter, the first information system may send a notification message to the second information system (for example, a commodity object information system). After receiving the notification message, the second information system may request the first information system to acquire the first information content. Second information content is then acquired by searching an information library associated with the second information system. For example, if the first information content includes image content, information such as a network address (e.g., URL: universal resource locator) of the relevant commodity object can be acquired by searching a database that provides an image search service. Thereafter, the second information content can be provided for the first user. Moreover, a feedback can also be sent to the first information system, for example, making a reply below the associated comment while the user references the target account number, to prompt the user to view the information about the commodity object through a message access approach. The message access approach may include an inter-account number message channel within the first information system, or may also include other approaches. In this way, the user can acquire the associated second information content without manually initiating operations such as image search in the second information system.

The specific implementations provided by the embodiments of the present disclosure are introduced in detail below.

Figure 2:
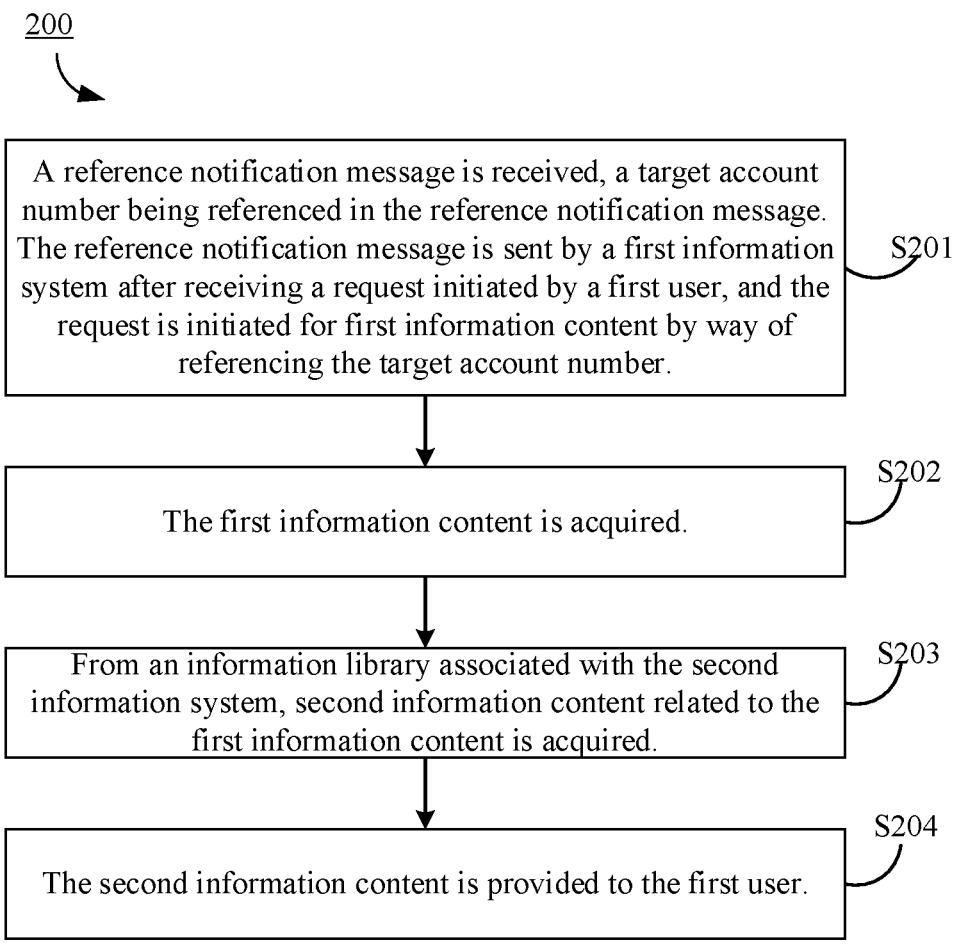
FIG. 2 is a flow chart illustrating an example of a first method, according to some embodiments of the present disclosure.

Some embodiments of the present disclosure provide a method for providing information, executed by an associated second information system, for example, a commodity object information system, a knowledge information system, a news information system, etc. FIG. 2 is a flow chart illustrating a first method 200 executed by an associated second information system, according to some embodiments of the present disclosure. Referring to FIG. 2, the method 200 includes steps S201 to S204.

At step S201, a reference notification message is received, a target account number being referenced in the reference notification message. The reference notification message is sent by a first information system after receiving a request initiated by a first user, and the request is initiated for first information content by way of referencing the target account number. The first information content includes information content generated in the first information system.

In some embodiments of the present disclosure, a target account number may be registered in the first information system in advance with the identity of a function module provided by relevant information provision service provided by the second information system. For example, the function module may be a function module that provides an image search service in a commodity object information system. Then, a corresponding nickname of the target account number registered in a social networking system with the identity of the functional module may be "image search account", and thus a user in the social networking system can initiate a search request by the way of "@image search account". In addition, information about the target account number (for example, nickname, ID, etc.) can also be provided for a user in the first information system in various ways. For example, it is possible to add comments in the comment areas of multiple posted pieces of content in the social networking system, and the content of the comments may be to notify the browsing user of the content that if the browsing user wants to acquire commodity object information related to the current content, the browsing user can make a comment in the comment area, and reference the target account number, etc.

The operation of referencing the target account number described in this example of the present disclosure is implemented through the account number referencing function defined by the first information system. For example, in a social networking system or an instant messaging system, an "@" symbol can usually be defined as the referencing function (or "mentioning", etc.). If a user A, while posting or sending certain information content, wants to prompt a user B to browse the information content, the content of "@user B account" may be included in the information content. Therefore, in addition to posting or sending the information content input by the user A, the first information system can further send a notification message to the user B. Thus, the information can be perceived by the user B in a higher-level way, etc. In this example of the present disclosure, since the target account number is registered in the first information system in advance, although the target account number may not correspond to a certain natural person, it corresponds to the second information system. Therefore, when the target account number is referenced, the first information system may also send the notification message to the second information system. In addition, in some embodiments, the second information system can also realize the subscription to the reference notification message by implementing a relevant interface in the first information system in advance, so that when the target account number is referenced, after the first information system sends a reference notification message to the second information system, the second information system can receive the reference notification message in time, and meanwhile can also acquire information carried in the reference notification message.

In some embodiments, to enable more browsing users in the first information system to know an approach to acquire the information, the information of the approach to acquire the information can be provided for the users in the first information system by way of implementing a relevant interface in the first information system, etc. For example, it is possible to detect information content posting events in a social network, and implement automatic comments on newly posted content. In this way, as long as newly posted information content is generated in the social networking system, the second information system can detect the information content, and make comments automatically, etc. Or, in some embodiments, after detecting a new content posting event in the social networking system, the second information system can first judge the new content to determine whether the new content is related to a certain type of information, for example, whether it is related to a commodity object, or related to a news event, etc. If yes, relevant information about the target account number can be provided for the user by way of automatic commenting or the like. For example, if it is a photo of a person, a landscape photo of a scenic spot, etc., all of which may be content related to commodity objects. The photo of the person may include clothes commodity objects, and the landscape photo of the scenic spot may involve some related commodity objects such as tourist routes, air tickets, hotels, etc.

It should be noted that, in this example of the present disclosure, the first information and the second information system may belong to a same system provider, or the first information system and the second information system may reach a cooperation relationship in advance. In this way, the information about various related interfaces in the first information system can be provided by the first information system for the second information system, and interfaces can be implemented in the second information system, so that functions such as subscription to various related information in the first information system can be achieved.

In the case of providing the target account number described above, if the user is interested in certain first information content during the process of browsing the first information system, for example, the user finds that a picture is the photo of a person and is interested in the clothes worn by the person, so that the user wants to know how to purchase. Then, the user can initiate a request for the first information content by way of referencing the target account number. Accordingly, the first information system can send a reference notification message to the second information system.

In various different first information systems, the ways of initiating the request may also be different. For example, if the first information system is a social networking system, in this type of system, users usually share content by "posting", and browsing users can comment on content through comment areas of "posts", so as to achieve interaction with content posters. In this case, if a first user browses first information content posted by a second user, and wants to initiate a request based on the content to acquire more information, the first user can comment on the first information content, and reference a target account number in the comment content. For example, if a nickname of the target account number is "image search account", the target account number can be referenced in the comment content by way of "@image search account" or the like. Or, if a first user wants to acquire knowledge information content, a target account number related to a knowledge information system may also be referenced, for example, "@knowledge account", or the like.

However, in an instant messaging system, users usually interact with each other by way of instant messaging conversations. For example, a first user talks to a second user, or participates in a group conversation. In such process, if the second user sends an instant message, for example, a picture, etc., and the first user needs to acquire more information about the picture. Then, the first user can send a new instant message and directly initiate a request by referencing a target account number in the message content. Accordingly, the instant messaging system can notify the second information system of the event that the target account number is referenced.

It should be noted that there may be multiple ways to reference the target account number in the newly sent instant message. For example, in one way, in the case that the first user knows the account name and other information of the target account number, the content of the reference to the target account number is input manually, for example, "@image search account" is input manually. Or in another way, after the first user performs an operation such as clicking or long pressing on the first information content, an operation option for referencing the target account number can be added into an operation option set that pops up. In this way, if the user wants to initiate a request for the first information content, the user can directly click on the operation option. Accordingly, content such as "@image search account" can be automatically input into an instant message editing area, thereby further improving efficiency.

In addition, it should be noted that in the case of a group conversation, since there may be a large number of people participating in the conversation, the message update speed is relatively high. For example, after the second user sends a message, and before the first user sends a request for referencing the target account number, other users may send other information content, so that it may be difficult to determine which message is the first information content required by the first user. Therefore, to facilitate the determination of the first information content, the first user can first reference the first information content, and then edit the instant messaging content on the basis of referencing the first information content, and then reference the target account number in the instant messaging content, etc. It should be noted that the same instant messaging content sent by the first user may include the referenced first information content and the referenced target account number at the same time, although both are called "referenced", the meanings of both are different. The first information content is referenced to illustrate that the content of the currently sent instant message is related to the first information content, and the target account number is referenced to illustrate that the content of the currently sent instant message is mainly sent to the target account number, and it is needed to prompt the user associated with the target account number to pay attention to. In this example of the present disclosure, the action of referencing the target account number may also play a role in initiating a search request.

At step S202, the first information content is acquired.

After the reference notification message that the target account number is referenced is received, the first information content can be first acquired, that is, the second information system needs to know what information content the first user needs to search for.

There may be many ways to acquire the first information content. For example, if the reference notification message directly carries the first information content, including image data or text data, the first information content can be directly parsed from the reference notification message, and subsequent search can be carried out. Or, in another case, the request may not directly carry the first information content. In this case, the first information content may be acquired from the first information system.

If the first information system is a social networking system, the first information content may be content that has been posted by the second user in the social networking system, which may include pictures, text, videos, or the combination of various types of information, etc. In this case, the data content of the first information content may be acquired in various ways. For example, in one way, the reference notification message may carry an identifier (ID, etc., information carried in the request may be determined by an implementation logic in the social networking system) of the first information content. In this case, after the reference notification message is received, a network address (for example, URL) corresponding to the first information content may be acquired according to the identification information carried in the message. Then, the first information content is acquired by accessing the network address and downloading the first information content. In some embodiments, assume that a user in a social networking system references a target account number corresponding to a second information system, the social networking system may send a relevant reference notification message to the second information system, and may carry information such as the ID of the associated first information content, so that the second information system can know which content the user has commented on. Furthermore, the second information system may acquire information such as a corresponding URL according to the ID of the first information content, so as to realize downloading of the first information content. In some embodiments, the message provided by the social networking system may also carry other information, such as the ID information of the user, and the ID of the related comment posted by the user.

If the first information system is an instant messaging system, the reference notification message provided by the first information system may also include information such as an instant messaging conversation ID, so that the second information system can acquire a conversation record corresponding to the ID from the first information system, and then acquire the first information content therefrom. For example, the content of the previous instant message referencing the target account number may be used as the first information content. Or, if the first information content is referenced when the target account number is referenced, and the referenced information content is carried in the reference notification information provided by the first information system, the first information content can be directly parsed from the reference notification message, etc.

At step S203, from an information library associated with the second information system, second information content related to the first information content is acquired.

After the first information content is acquired, a search may be performed on an information library associated with the second information system to acquire second information content associated with the first information content. Since the first information content may be in various forms, for example, may include text, pictures, videos, etc., search methods may also be different for the first information content of different information forms. For example, if the first information content is text, keyword retrieval technology can be used for comparing relevant text of the first information content with text description information of the information content (for example, commodity object information, etc.) in the information library, and determining the matching second information content. In some embodiments, for example, in the case that the second information system is a commodity object information system, this example of the present disclosure may more involve retrieval of image content. That is to say, the first information content may include image content, which may be pictures or videos. In this case, commodity object information associated with the first information content can be searched from the information library associated with the commodity object information system by way of image search. For example, in some embodiments, similarity comparison can be carried out between the image of the first information content and images of a plurality of commodity objects in the information library. Such comparison process can also extract the image belonging to the main part of the commodity object included in the image, so as to remove the influence of the images of background, character and the like, and improve the accuracy of matching.

In some embodiments, the second information system may be a knowledge information system, or a news information system, etc. Therefore, the searched second information content may include knowledge information content, news information content, etc. For example, during an instant messaging conversation, a first user finds that a second user has sent a message that includes a person's name, and the first user may need to know more information about the person's name, for example, character introduction, or related news information, etc. The first user usually needs to manually open a search engine client-side device or a news client-side device, and then input the person's name to initiate a search, and then acquire required information from returned search results. However, in this example of the present disclosure, the first user only needs to edit a new instant message in a dialog box of an instant messaging conversation and reference a target account number, then the second information content provided by the corresponding second information system can be acquired. For example, if the target account number corresponding to the knowledge information system is referenced, the second information content provided may include information such as the introduction of the corresponding person. If the target account number corresponding to the news information system is referenced, the second information provided may be news event information related to the person, etc.

The second information content may be expressed in various forms. For example, there may be one or more pieces of associated second information content. If there is one piece of the second information content, network address information such as a URL of the second information content may be directly provided. If there are multiple pieces of the second information content, the multiple pieces of second information content may be aggregated into one page, a corresponding URL is generated for the aggregated page, and the URL of the aggregated page is provided to the first user. In some embodiments, relevant pages in the second information system can be directly intercepted as pictures, and the second information content can be provided to the first user in the form of pictures, or can also exist in the form of information cards, or in the form of text, etc.

At step S204, the second information content is provided to the first user.

After the relevant second information content is determined, the second information content can be provided, in various ways, to the first user who sends the request. For example, in one way, since the identification information such as the ID and account number of the user in the first information system can be acquired when receiving the reference notification message, the second information content can be sent to the account number of the user by means of an inter-account messaging channel (for example, "private message", etc.) provided by the first information system. In some embodiments, since the first information system may restrict the sending and receiving of messages between "strange" account numbers (the account numbers who do not "follow" each other or add each other as "friends", etc.), for example, the number of messages is restricted. In some embodiments of the present disclosure, second information content is provided to a user who has followed the target account number, or a user who added the target account number to a "contact" list. That is to say, for the user who has followed the target account number, or the user who added the target account number as a "friend", the first account number information associated with the user in the first information system can be acquired, and then, the second information content is sent to the first account number through the inter-account messaging channel provided in the first information system. It should be noted that since the message content sent and received by the accounts of the first information system may include external links. After the URL of the second information content is provided to the user, the user can directly click the URL or copy the URL to open a page corresponding to the link, so as to view the details of the second information content.

In some embodiments, to provide the second information content to the user more conveniently, when the first information system is a social networking system, the second information system can also prompt the first user, by way of leaving a message in the comment area of the first information content, to pay attention to the target account number. In some embodiments, a leaving-message function may be realized by implementing the relevant interface in the first information system and the like.

In some embodiments, in the way of sending the second information content to the first account number through the inter-account messaging channel provided in the first information system, if the user account number systems used by the first information system and the second information system are the same or have a mapping relationship, and the second information content sent to the first account number includes a link, after the link is triggered, the page corresponding to the link can be directly displayed in the first information system, so that the user can perform operations on the second information content in the first information system. That is to say, the page corresponding to the link associated with the second information content can be browsed, and the execution of various operations can be realized in the first information system, without redirecting to the second information system. For example, when the second information system is a commodity object information system, and the second information content is commodity object information, the operations may include one or more of the following items: adding the commodity object to a set to be settled, purchasing, paying, favoriting, or the like.

In another implementation, the information of a second account number associated with the first user in the second information system may also be acquired, and then, the second information content may be provided for the first user by way of sending a system message to the second account number in the second information system. In this way, the first user can log onto the second information system, and view the second information content on pages such as a message center provided by a client-side device of the second information system. The second information content here can also be in various forms such as links, pictures, text, information cards, etc. Users can also directly click the link to redirect to a detailed information page for browsing.

There are many ways to acquire the second account number of the user. For example, in one way, when the first user initiates a search request by referencing the target account number, the first user can provide the information of the second account number registered by the user in the second information system when initiating a search request by referencing the target account number. In this way, when the second information system receives the reference notification message, the second account number information of the user can be acquired at the same time. After the second information content is acquired, the second information content may be provided to the user directly by sending a system message to the second account number in the second information system.

Or, in another way, if the first information system and the second information system enable the account number systems of the users to be in communication with each other in advance, the information of account numbers registered by the same user in the two systems is the same or has a mapping relationship, and can be stored in the second information system. After the first account number registered by the user in the first information system is acquired, the second account number registered by the user in the second information system can be determined according to the stored mapping relationship information. Similarly, the second information content related to the first information content in the first information system may be provided to the user by way of sending a system message to the second account number within the second information system, etc.

In some embodiments, when the first information system is a social networking system, a comment identifier associated with a corresponding user comment when the target account number is referenced can also be acquired. After the second information content is provided for the user through a channel, notification can be performed for the event that the second information content has been provided for the first user by way of replying to the comment content corresponding to the comment identifier, to prompt the first user to acquire information details under the corresponding channel, etc.

Figure 3A:
FIG. 3A to FIG. 3C are schematic diagrams illustrating an example of an interface, according to some embodiments of the present disclosure.
Figure 3B:
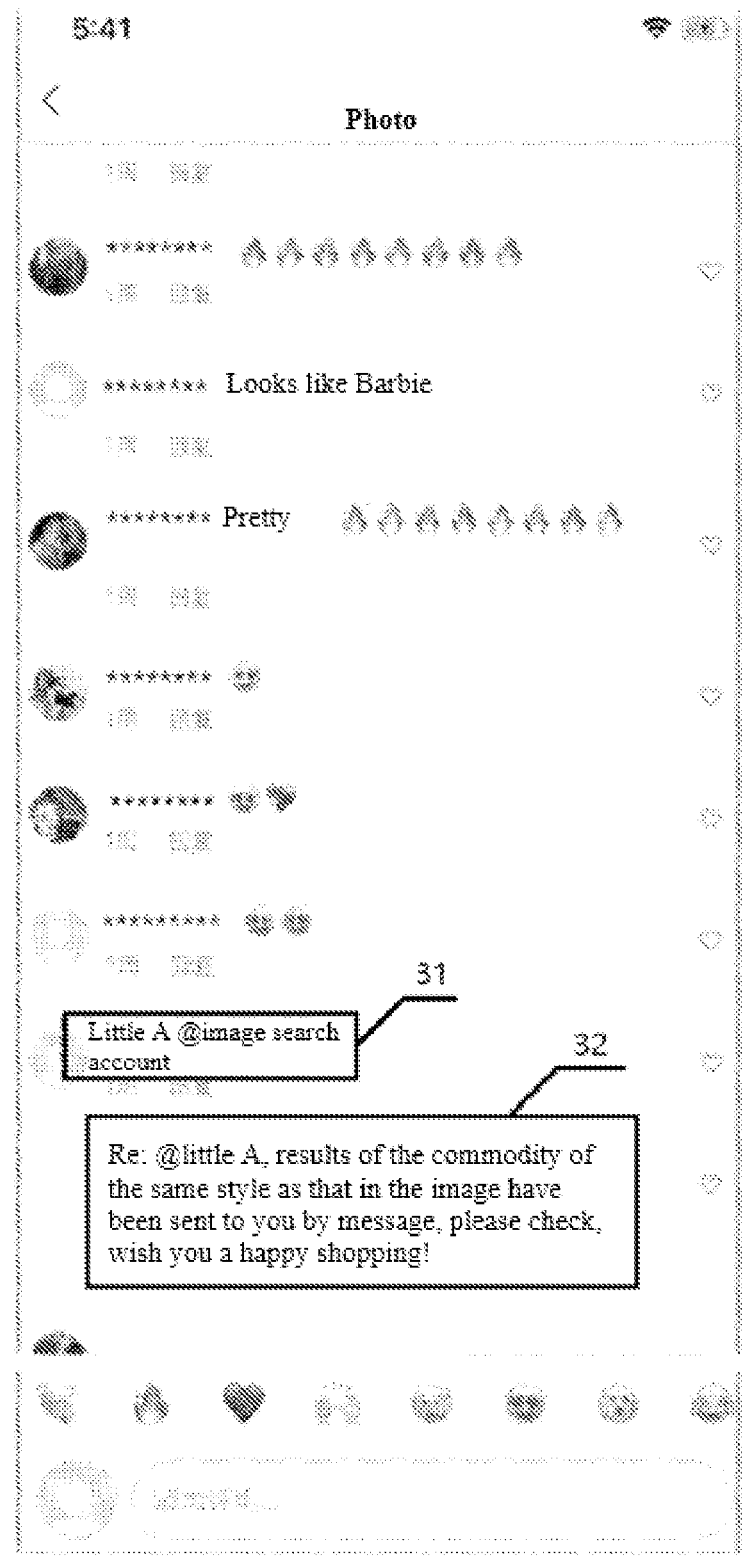
Figure 3C:
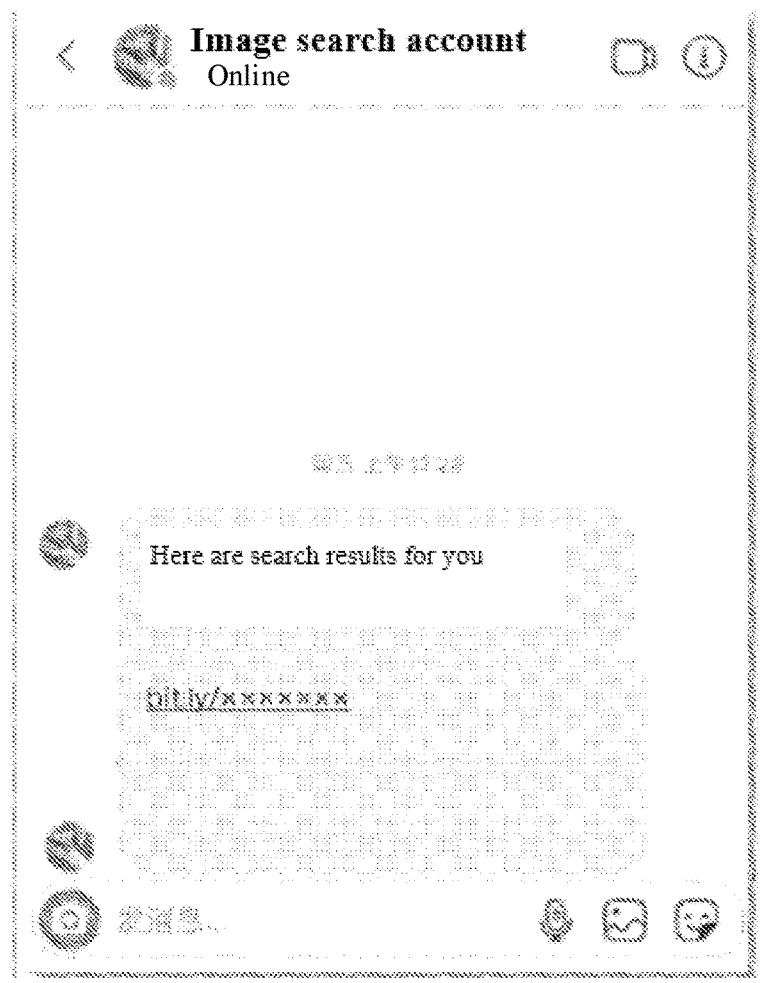

For example, assume that the content that the user browses in the social networking system is a photo of a person, as shown in FIG. 3A, the user is interested in clothes worn by the person, and wants to acquire information about the associated commodity object. In this case, the user can post a comment in the comment area of the content and mention a target account number. For example, assume that a nickname of the user in the social networking system is "little A", and the target account number corresponding to the commodity object information system is "image search account", the comment content posted by the user may be shown at 31 in FIG. 3B. After the commodity object information system receives the comment content of "little A" and picture information is acquired, the commodity object related to the picture can be searched. After the account number and other information of the user in the social networking system can be acquired, the information of the commodity object can be provided for the user by way of sending a private message. Furthermore, the comment corresponding to the user may be replied, and the user is informed of a message that the commodity object information has been provided. For example, as shown at 32 in FIG. 3B, the content of a reply may be "@little A, results of the commodity of the same style as that in the image have been sent to you by message, please check, wish you a happy shopping!", etc. After viewing the reply, the user can view in message options. For example, as shown in FIG. 3C, which is a dialog window interface for message interaction between the user and the target account number, the target account number can send the information of the determined commodity object to the user by way of inter-account number message. The information of the commodity object may be provided in the form of a link, and the user can directly click on the link, to redirect to a client-side device of the associated commodity object information system (if the client-side device is installed by the user) to display a corresponding commodity object information page, or to display a commodity object information page by a browser, etc.

According to some embodiments of the present disclosure, when the user browses the first information content in the first information system and needs to acquire more information related to the first information content, the user can initiate the request for the first information content by referencing the target account number. Accordingly, the first information system can send the reference notification message to the second information system associated with the target account number. After receiving the notification message, the second information system can acquire the first information content, and determine the second information content related to the first information content by retrieving the associated information library. Thereafter, the second information content may be provided to the user. In this way, the user can acquire the second information content related to the first information content provided by the second information system without switching to the second information system and manually initiating operations such as image search, which is convenient for the user to acquire the desired information, and thus enables the second information system to acquire more user traffic.

Figure 4:
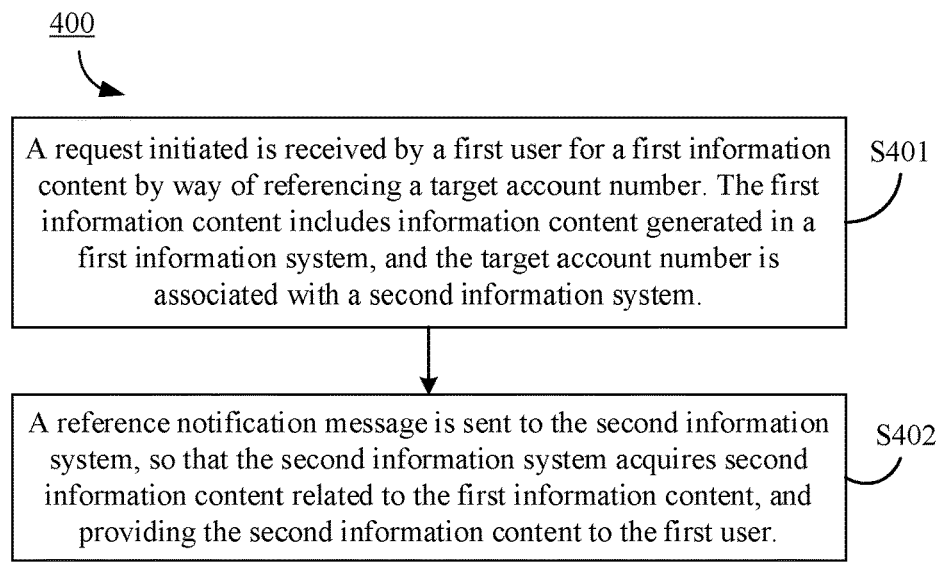
FIG. 4 is a flow chart illustrating an example of a second method, according to some embodiments of the present disclosure.

Corresponding to method 200 executed by a second information system, some embodiments of the present disclosure provide an information processing method executed by a first information system (for example, a social networking system, an instant messaging system, etc.). FIG. 4 is a flow chart illustrating a second method 400 executed by a first information system, according to some embodiments of the present disclosure Referring to FIG. 4, method 400 may include step S401 and S402.

At step S401, a request initiated is received by a first user for a first information content by way of referencing a target account number. The first information content includes information content generated in a first information system, and the target account number is associated with a second information system.

At step S402, a reference notification message is sent to the second information system, so that the second information system acquires second information content related to the first information content, and providing the second information content to the first user.

It should be noted that this example of the present disclosure may involve the use of user data. In practical applications, in accordance with applicable laws and regulations of a host country (for example, explicitly consent of the user, effective notification to the user, etc.), specific personal data of the user can be used in the solution described herein to the extent permitted by the applicable laws and regulations.

This example of the present disclosure may also involve the transfer of user data between different systems. In this case, in accordance with the applicable laws and regulations of the host country (for example, explicit consent of the user, effective notification to the user, etc.), specific personal data of the user can also be used in the solution described herein to the extent permitted by the applicable laws and regulations. For example, when a user in a social networking system sends comment information that mentions a target account number, the user may be prompted that relevant user data may need to be provided for a commodity object information system associated with the target account number, and the product object information system may send the information of a commodity object to the user by way of sending a "private message", and then provide information such as the user ID for the commodity object information system with explicit consent of the user, and can provide a relevant interface for sending "private messages" to the user for the commodity object information system, so that the commodity object information system can provide the information of the commodity object by way of sending the "private message" to the user through the social networking system.

Figure 5:
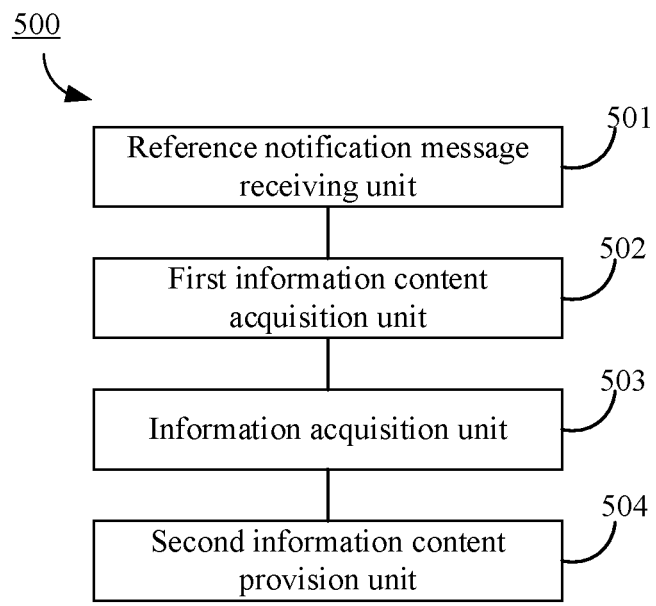
FIG. 5 is a schematic diagram illustrating an example of a first apparatus, according to some embodiments of the present disclosure.

Corresponding to method 200, some embodiments of the present disclosure provide an apparatus for providing information. FIG. 5 is a schematic diagram of a first apparatus 500, according to some embodiments of the present disclosure. Referring to FIG. 5, the apparatus 500 includes a reference notification message receiving unit 501, a first information content acquisition unit 502, an information acquisition unit 503, and a second information content provision unit 504.

Reference notification message receiving unit 501 is configured to receive a reference notification message that a target account number is referenced. The reference notification message is sent by a first information system after receiving a request initiated by a first user for first information content by way of referencing the target account number. The first information content includes information content generated in the first information system. The target account number is associated with a second information system.

First information content acquisition unit 502 comprises circuitry configured to acquire the first information content.

Information acquisition unit 503 comprises circuitry configured to acquire, from an information library associated with the second information system, second information content related to the first information content.

Second information content provision unit 504 comprises circuitry configured to provide the second information content to the first user.

First information system 500 includes a social networking system, and the first information content includes information content posted by a second user in the social networking system.

In this case, the request is initiated by the first user by the way of posting comment content in a comment area of the first information content and referencing the target account number in the comment content.

In some embodiments, first information content acquisition unit 502 is configured to acquire, from the first information system, a network address corresponding to the first information content according to the identifier of the first information content carried in the reference notification message; and acquire the first information content by way of accessing the network address and downloading the first information content.

In some embodiments, the first information system includes an instant messaging system, and the first information content includes first instant messaging content sent by the second user of the instant messaging system in the process of an instant messaging conversation.

In this case, the request is initiated by the first user by way of sending the second instant messaging content in the instant messaging conversation and referencing the target account number in the second instant messaging content after the first message content is generated in an instant messaging conversation record.

The instant messaging conversation includes a group conversation, and the second instant messaging content further includes a reference to the first instant messaging content.

First information content acquisition unit 502 is further configured to: acquire, from information carried in the reference notification message, the first information content.

In some embodiments, the second information system includes a commodity object information system.

Information acquisition unit 503 may be configured to: acquire, from an information library associated with the commodity object information system, commodity object information content related to the first information content.

The first information content includes image content.

Information acquisition unit 503 may be further configured to: acquire, from the information library associated with the commodity object information system, the commodity object information content related to the first information content by way of image search.

In some embodiments, the second information system includes a knowledge information system.

Information acquisition unit 503 may be configured to: acquire, from an information library associated with the knowledge information system, knowledge information content related to the first information content.

In some embodiments, the second information system includes a news information system.

Information acquisition unit 503 may be configured to: acquire, from an information library associated with the news information system, news information content related to the first information content.

In some embodiments, second information content provision unit 504 may be configured to: acquire information about a first account number associated with the first user in the first information system; and send the second information content to the first account number through an inter-account messaging channel provided in the first information system.

The first account number and the target account number have a following relationship or a friend relationship.

In some embodiments, second information content provision unit 504 may be configured to: acquire information about a second account number associated with the first user in the second information system; and provide the second information content for the user by way of sending a system message to the second account number in the second information system.

The second information content includes one or more of the following items: link content, image content and text content.

In some embodiments, the first information system and the second information system may use the same user account number system or user account number systems having a mapping relationship. The second information content includes link content. In this case, after the link content is triggered, a page corresponding to the link is displayed in the first information system, so that the first user can perform operations on the second information content in the first information system.

Figure 6:
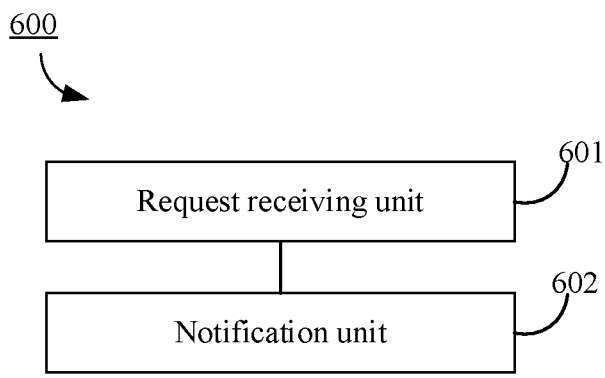
FIG. 6 is a schematic diagram illustrating an example of a second apparatus, according to some embodiments of the present disclosure.

Corresponding to method 400, some embodiments of the present disclosure further provide an information processing apparatus. FIG. 6 is a schematic diagram of a second apparatus 600, according to some embodiments of the present disclosure. Referring to FIG. 6, apparatus 600 includes a request receiving unit 601 and a notification unit 602.

Request receiving unit 601 is configured to receive a request initiated by a first user for first information content by way of referencing a target account number. The first information content includes information content generated in a first information system, and a target account number is associated with a second information system.

Notification unit 602 is configured to send a reference notification message to the second information system, so that the second information system acquires second information content related to the first information content, and is further configured to provide the second information content for the first user.

Some embodiments of the present disclosure further provide a computer-readable storage medium on which a computer program is stored, and the steps of the method according to any one of the foregoing method embodiments are implemented when the program is executed by a processor.

Some embodiments of the present disclosure further provide an electronic device. The electronic device includes one or more processors; and a memory associated with the one or more processors. The memory is configured to store program instructions, and the program instructions. When read and executed by the one or more processors, the method according to any one of the foregoing method embodiments is performed by the one or more processors.

Figure 7:
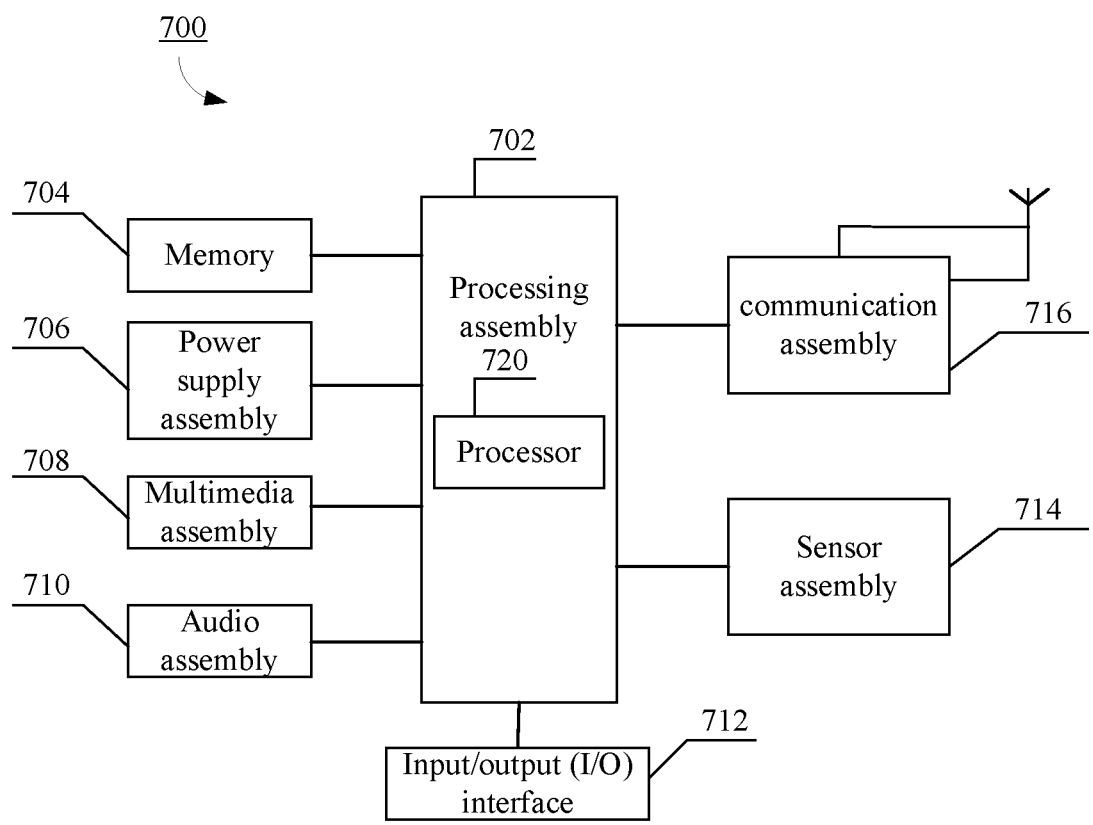
FIG. 7 is a schematic diagram illustrating an example of an electronic device, according to some embodiments of the present disclosure.

FIG. 7 is a schematic diagram of an electronic device 700, according to some embodiments of the present disclosure. For example, electronic device 700 may be a mobile phone, a computer, a digital broadcast terminal, a messaging device, a game console, a tablet device, a medical device, a fitness device, a personal digital assistant, aircraft, etc.

Referring to FIG. 7, electronic device 700 may include one or more of the following assemblies: a processing assembly 702, a memory 704, a power supply assembly 706, a multimedia assembly 708, an audio assembly 710, an input/output (I/O) interface 712, a sensor assembly 714, and a communication assembly 716.

Processing assembly 702 is configured to control overall operations of electronic device 700, such as the operations associated with display, telephone calls, data communications, camera operations, and recording operations. Processing element 702 may include one or more processors 720 to execute instructions to perform all or part of the steps of the method provided by the technical solution of the present disclosure. In some embodiments, processing assembly 702 may include one or more modules that facilitate interaction between processing assembly 702 and other assemblies. For example, processing assembly 702 may include a multimedia module to facilitate interaction between multimedia assembly 708 and processing assembly 702.

Memory 704 is configured to store various types of data to support operations on electronic device 700. Examples of such data include instructions for any application or method operating on electronic device 700, contact data, phonebook data, messages, images, videos, and the like. Memory 704 may be realized by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

Power supply assembly 706 provides power for various assemblies of electronic device 700. The power supply assembly 706 may include a power supply management system, one or more power supplies, and other assemblies associated with generating, managing, and distributing power for electronic device 700.

Multimedia assembly 708 includes a screen that provides an output interface between electronic device 700 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, swipes, and gestures on the touch panel. The touch sensor may not only sense a boundary of a touch or swipe action, but also detect duration and pressure associated with a touch or swipe operation. In some embodiments, multimedia assembly 708 includes a front camera and/or a rear camera. When electronic device 700 is in an operation mode, such as a shooting mode or a video mode, the front camera and/or the rear camera can receive external multimedia data. Each front camera and rear camera may be a fixed optical lens system or have focal length and optical zoom capabilities.

Audio assembly 710 is configured to output and/or input audio signals. For example, audio assembly 710 includes a microphone (MIC), which is configured to receive external audio signals when electronic device 700 is in operation modes, such as a call mode, a recording mode and a voice recognition mode. The received audio signals may be further stored in memory 704 or sent via communication assembly 716. In some embodiments, audio assembly 710 further includes a speaker configured to output audio signals.

I/O interface 712 is configured to provide an interface between processing assembly 702 and a peripheral interface module that may be a keyboard, a click wheel, buttons, or the like. These buttons may include, but are not limited to: a home button, volume buttons, a start button, and a lock button.

Sensor assembly 714 includes one or more sensors configured to provide status assessments of all aspects for electronic device 700. For example, sensor assembly 714 can detect an open/closed state of electronic device 700, and relative positioning of assemblies, for example, the assemblies are a display and a keypad of electronic device 700. Sensor component 714 can also detect a change in the position of electronic device 700 or an assembly of electronic device 700, the presence or absence of the contact between the user and electronic device 700, the orientation or acceleration/deceleration of electronic device 700 and a change in the temperature of electronic device 700. Sensor assembly 714 may include a proximity sensor configured to detect the presence of nearby objects without any physical contact. Sensor assembly 714 may further include an optical sensor, such as a CMOS or CCD image sensor, for use in imaging applications. In some embodiments, sensor assembly 714 may further include an acceleration sensor, a gyroscope sensor, a magnetic sensor, a pressure sensor or a temperature sensor.

Communication assembly 716 is configured to facilitate wired or wireless communications between electronic device 700 and other devices. Electronic device 700 may access wireless networks based on communication standards, such as Wi-Fi, or 2G, 3G, 4G/LTE, 5G and other mobile communication networks. In an exemplary example, communication component 716 receives a broadcast signal or broadcast related information from an external broadcast management system via a broadcast channel. In an exemplary embodiment, communication component 716 further includes a near field communication (NFC) module to facilitate short-range communication. For example, the NFC module may be implemented based on radio frequency identification (RFID) technology, infrared data association (IrDA) technology, ultra wideband (UWB) technology, bluetooth (BT) technology and other technologies.

In an exemplary example, electronic device 700 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements for performing the method described above.

In an exemplary embodiment, further provided is a non-transitory computer-readable storage medium including instructions, such as a memory 704 including instructions, the instructions can be executed by processor 720 of electronic device 700 to implement the method provided by the technical solution of the present disclosure. For example, the non-transitory computer-readable storage medium may be a ROM, a random-access memory (RAM), a CD-ROM, a magnetic tape, a floppy disk, an optical data storage device, etc.

The embodiments may further be described using the following clauses:

1. A method for providing information, comprising:
receiving a reference notification message that a target account number is referenced, the reference notification message being sent by a first information system after receiving a request initiated by a first user for first information content by way of referencing the target account number, the first information content comprising information content generated in the first information system, and the target account number being associated with a second information system;
acquiring the first information content;
acquiring, from an information library associated with the second information system, second information content related to the first information content; and
providing the second information content for the first user.

2. The method according to clause 1, wherein the first information system comprises a social networking system, and the first information content comprises information content posted by a second user in the social networking system; and
the request is initiated by the first user by way of posting comment content in a comment area of the first information content and referencing the target account number in the comment content.

3. The method according to clause 2, wherein
the acquiring the first information content comprises:
acquiring, from the first information system, a network address corresponding to the first information content according to an identifier of the first information content carried in the reference notification message; and
acquiring the first information content by way of accessing the network address and downloading the first information content.

4. The method according to clause 1, wherein
the first information system comprises an instant messaging system, and the first information content comprises first instant messaging content sent by a second user of the instant messaging system in an instant messaging conversation process; and
the request is initiated by the first user by way of sending second instant messaging content in the instant messaging conversation and referencing the target account number in the second instant messaging content after the first message content is generated in a conversation record of the instant messaging conversation.

5. The method according to clause 4, wherein
the instant messaging conversation comprises a group conversation, and the second instant messaging content further comprises content that references the first instant messaging content; and
the acquiring the first information content comprises:
acquiring the first information content from information carried in the reference notification message.

6. The method according to clause 1, wherein
the second information system comprises a commodity object information system; and
the acquiring, from an information library associated with the second information system, second information content related to the first information content comprises:
acquiring, from an information library associated with the commodity object information system, commodity object information content related to the first information content.

7. The method according to clause 6, wherein
the first information content comprises image content; and
the acquiring, from an information library associated with the commodity object information system, commodity object information content related to the first information content comprises:
acquiring, from the information library associated with the commodity object information system, the commodity object information content related to the first information content by way of image search.

8. The method according to clause 1, wherein
the second information system comprises a knowledge information system; and
the acquiring, from an information library associated with the second information system, second information content related to the first information content comprises:
acquiring, from an information library associated with the knowledge information system, knowledge information content related to the first information content.

9. The method according to clause 1, wherein
the second information system comprises a news information system; and
the acquiring, from an information library associated with the second information system, second information content related to the first information content comprises:
acquiring, from an information library associated with the news information system, news information content related to the first information content.

10. The method according to clause 1, wherein
the providing the second information content for the first user comprises:
acquiring information about a first account number associated with the first user in the first information system; and
sending the second information content to the first account number through an inter-account messaging channel provided in the first information system.

11. The method according to clause 10, wherein
the first account number and the target account number have a following relationship or a friend relationship.

12. The method according to clause 1, wherein
the providing the second information content for the first user comprises
acquiring information about a second account number associated with the first user in the second information system; and
providing the second information content for the user by way of sending a system message to the second account number in the second information system.

13. The method according to clause 1, wherein
the second information content comprises one or more of the following items: link content, image content, and text content.

14. The method according to clause 1, wherein
the first information system and the second information system use the same user account number system or user account number systems having a mapping relationship;
the second information content comprises link content; and
after the link content is triggered, a page corresponding to the link is displayed in the first information system, so that the first user performs operations on the second information content in the first information system.

15. An information processing method, comprising:
receiving a request initiated by a first user for first information content by way of referencing a target account number, the first information content comprising information content generated in a first information system, and the target account number being associated with a second information system; and
sending a reference notification message to the second information system, so that the second information system acquires second information content related to the first information content, and providing the second information content for the first user.

16. An apparatus for providing information, comprising:
a reference notification message receiving unit, configured to receive a reference notification message that a target account number is referenced, the reference notification message being sent by a first information system after receiving a request initiated by a first user for first information content by way of referencing the target account number, the first information content comprising information content generated in the first information system, and the target account number being associated with a second information system;
a first information content acquisition unit, configured to acquire the first information content;
an information acquisition unit, configured to acquire, from an information library associated with the second information system, second information content related to the first information content; and
a second information content provision unit, configured to provide the second information content for the first user.

17. An information processing apparatus, comprising:
a request receiving unit, configured to receive a request initiated by a first user for first information content by way of referencing a target account number, the first information content comprising information content generated in a first information system, and the target account number being associated with a second information system;
a notification unit, configured to send a reference notification message to the second information system so that the second information system acquires second information content related to the first information content, and provide the second information content for the first user.

18. A computer-readable storage medium on which a computer program is stored, wherein the program, when executed by a processor, implements steps of the method according to any one of clauses 1-15.

19. An electronic device, comprising:
one or more processors; and
a memory associated with the one or more processors, the memory being configured to store program instructions, and the program instructions, when read and executed by the one or more processors, implementing steps of the method according to any one of clauses 1-15.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for providing information, comprising:
receiving a reference notification message that a target account number is referenced, the reference notification message being sent by a first information system after receiving a request initiated by a first user for first information content by way of referencing the target account number, wherein the first information content comprises information content generated in the first information system, and the target account number is associated with a second information system;
acquiring the first information content;
acquiring, from an information library associated with the second information system, second information content related to the first information content; and
providing the second information content to the first user, wherein providing the second information content to the first user further comprises:
acquiring information about a first account number associated with the first user in the first information system, and
sending the second information content to the first account number through an inter-account messaging channel provided in the first information system; or
acquiring information about a second account number associated with the first user in the second information system, and
providing the second information content for the user by way of sending a system message to the second account number in the second information system.

2. The method according to claim 1, wherein the first information system comprises a social networking system, and the first information content comprises information content posted by a second user in the social networking system; and the request is initiated by the first user by way of posting comment content in a comment area of the first information content and referencing the target account number in the comment content.

3. The method according to claim 2, wherein acquiring the first information content further comprises:
acquiring, from the first information system, a network address corresponding to the first information content according to an identifier of the first information content carried in the reference notification message; and
acquiring the first information content by way of accessing the network address and downloading the first information content.

4. The method according to claim 1, wherein the first information system comprises an instant messaging system, and the first information content comprises first instant messaging content sent by a second user of the instant messaging system in an instant messaging conversation process; and the request is initiated by the first user by way of sending second instant messaging content in the instant messaging conversation and referencing the target account number in the second instant messaging content after the first message content is generated in a conversation record of the instant messaging conversation.

5. The method according to claim 4, wherein the instant messaging conversation comprises a group conversation, and the second instant messaging content further comprises content that references the first instant messaging content; and wherein acquiring the first information content comprises:
acquiring the first information content from information carried in the reference notification message.

6. The method according to claim 1, wherein the second information system comprises a commodity object information system; and wherein acquiring, from the information library associated with the second information system, second information content related to the first information content comprises:
acquiring, from an information library associated with the commodity object information system, commodity object information content related to the first information content.

7. The method according to claim 6, wherein the first information content comprises image content; and wherein acquiring, from the information library associated with the commodity object information system, commodity object information content related to the first information content comprises:
acquiring, from the information library associated with the commodity object information system, the commodity object information content related to the first information content by way of image search.

8. The method according to claim 1, wherein the second information system comprises a knowledge information system; and wherein acquiring, from the information library associated with the second information system, second information content related to the first information content comprises:
acquiring, from an information library associated with the knowledge information system, knowledge information content related to the first information content.

9. The method according to claim 1, wherein the second information system comprises a news information system; and wherein acquiring, from the information library associated with the second information system, second information content related to the first information content comprises:

acquiring, from an information library associated with the news information system, news information content related to the first information content.

10. The method according to claim 1, wherein the first account number and the target account number have a following relationship or a friend relationship.

11. The method according to claim 1, wherein the second information content comprises one or more of the following items: link content, image content, and text content.

12. The method according to claim 1, wherein the first information system and the second information system use the same user account number system or user account number systems having a mapping relationship;
the second information content comprises link content; and
after the link content is triggered, a page corresponding to the link is displayed in the first information system.

13. An apparatus for providing information, comprising:
a memory configured to store instructions; and
one or more processors configured to execute the instructions to cause the apparatus to perform operations comprising:
receiving a reference notification message that a target account number is referenced, the reference notification message being sent by a first information system after receiving a request initiated by a first user for first information content by way of referencing the target account number, and the first information content comprises information content generated in the first information system, and the target account number is associated with a second information system;
acquiring the first information content;
acquiring, from an information library associated with the second information system, second information content related to the first information content; and
providing the second information content to the first user, wherein providing the second information content to the first user further comprises:
acquiring information about a first account number associated with the first user in the first information system, and
sending the second information content to the first account number through an inter-account messaging channel provided in the first information system; or acquiring information about a second account number associated with the first user in the second information system, and
providing the second information content for the user by way of sending a system message to the second account number in the second information system.

14. A non-transitory computer readable medium that stores a set of instructions that is executable by one or more processors of an apparatus to cause the apparatus to perform operations comprising:
receiving a reference notification message that a target account number is referenced, the reference notification message being sent by a first information system after receiving a request initiated by a first user for first information content by way of referencing the target account number, wherein the first information content comprises information content generated in the first information system, and the target account number is associated with a second information system;
acquiring the first information content;
acquiring, from an information library associated with the second information system, second information content related to the first information content; and
providing the second information content to the first user, wherein providing the second information content to the first user further comprises:
acquiring information about a first account number associated with the first user in the first information system, and
sending the second information content to the first account number through an inter-account messaging channel provided in the first information system; or
acquiring information about a second account number associated with the first user in the second information system, and
providing the second information content for the user by way of sending a system message to the second account number in the second information system.

15. The apparatus according to claim 13, wherein the first account number and the target account number have a following relationship or a friend relationship.

16. The non-transitory computer readable medium according to claim 14, wherein the first account number and the target account number have a following relationship or a friend relationship.

* * * * *